United States Patent [19]
Jonqueres

[11] Patent Number: 6,128,909
[45] Date of Patent: Oct. 10, 2000

[54] AIR CYCLE ENVIRONMENTAL CONTROL SYSTEMS WITH TWO STAGE COMPRESSION AND EXPANSION AND SEPARATE AMBIENT AIR FAN

[75] Inventor: Michel A. Jonqueres, Torrance, Calif.

[73] Assignee: AlliedSignal Inc., Morristown, N.J.

[21] Appl. No.: 09/324,306

[22] Filed: Jun. 2, 1999

Related U.S. Application Data

[60] Provisional application No. 60/088,027, Jun. 4, 1998.

[51] Int. Cl.[7] ........................................ F25B 9/00
[52] U.S. Cl. ..................................... 62/87; 62/93; 62/402
[58] Field of Search ................................... 62/86, 87, 93, 62/402

[56] References Cited

U.S. PATENT DOCUMENTS

| | | |
|---|---|---|
| Re. 32,100 | 4/1986 | Rannenberg . |
| 2,526,103 | 10/1950 | Wood . |
| 2,767,561 | 10/1956 | Seeger . |
| 3,026,681 | 3/1962 | Green . |
| 3,097,508 | 7/1963 | Leech . |
| 3,177,679 | 4/1965 | Quick . |
| 3,289,436 | 12/1966 | Groves . |
| 3,494,145 | 2/1970 | Davis . |
| 3,735,601 | 5/1973 | Stannard . |
| 4,198,830 | 4/1980 | Campbell . |
| 4,246,759 | 1/1981 | Signoret . |
| 4,312,191 | 1/1982 | Biagini . |
| 4,430,867 | 2/1984 | Warner . |
| 4,535,606 | 8/1985 | Rannenberg . |
| 4,539,816 | 9/1985 | Fox ........................................... 62/402 |
| 4,875,345 | 10/1989 | Signoret . |
| 4,963,174 | 10/1990 | Payne . |
| 4,966,005 | 10/1990 | Cowell . |
| 4,967,565 | 11/1990 | Thomson . |
| 5,014,518 | 5/1991 | Thomson . |
| 5,056,335 | 10/1991 | Renninger et al. ....................... 62/402 |
| 5,086,622 | 2/1992 | Warner . |
| 5,086,625 | 2/1992 | Momose . |

*Primary Examiner*—Ronald Capossela
*Attorney, Agent, or Firm*—William J. Zak, Jr. Esq.

[57] ABSTRACT

An environmental control system provides for two stage compression and expansion of a bleed air within a cooling cycle, while allowing for a separately driven fan to handle ambient air as a heat sink. The system comprises a plurality of compressors capable of compressing a water vapor bearing air to produce a compressed air. A reheater is capable of cooling the compressed air. A condenser is in flow communication with the reheater, with the condenser being capable of condensing the water vapor. A water extractor is in flow communication with and intermediate of the condenser and the reheater. A plurality of turbines are in flow communication with and downstream of the reheater.

47 Claims, 4 Drawing Sheets

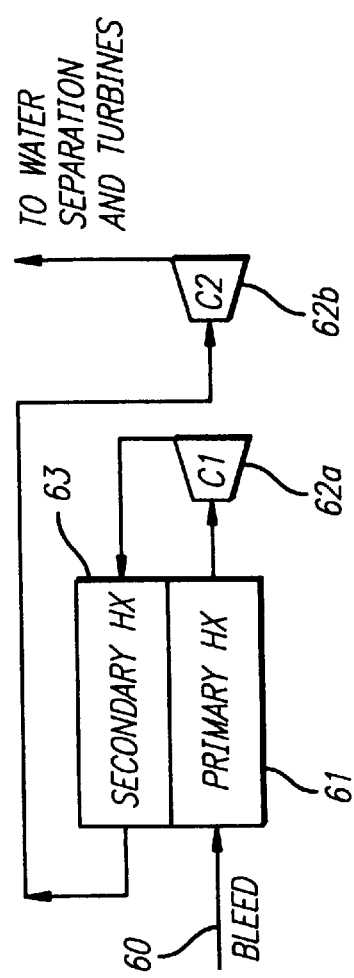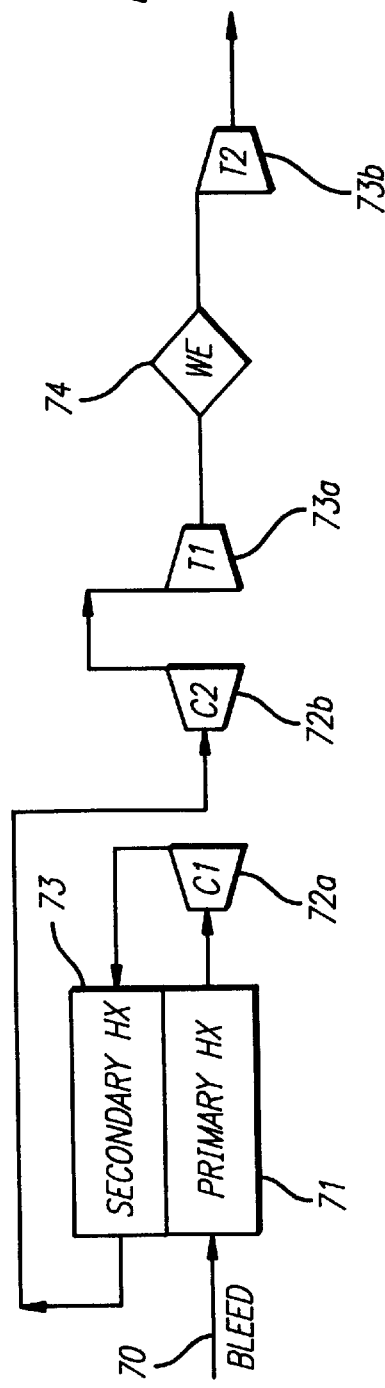

AIR CYCLE ENVIRONMENTAL CONTROL SYSTEMS WITH TWO STAGE COMPRESSION AND EXPANSION AND SEPARATE AMBIENT AIR FAN

CROSS REFERENCE TO RELATED APPLICATIONS

This application claims the benefit of U.S. Provisional application Ser. No. 60/088,027 filed on Jun. 4, 1998.

BACKGROUND OF THE INVENTION

The present invention generally relates to air cycle Environmental Control Systems (ECSs) and, more specifically, to an improved air cycle ECS and improved method of conditioning water vapor bearing air while minimizing energy losses that might otherwise occur during water vapor removal.

ECSs are used to provide a supply of conditioned air to an enclosure, such as an aircraft cabin and cockpit. An air cycle ECS typically operates on a flow of bleed air taken from an intermediate or high pressure stage within a jet engine having multi-compression stages or from an auxiliary power unit (APU) having a compressor specifically designed as a source of compressed air to the aircraft air conditioning system. All air compressed by the engine or APU is initially ambient air which may contain substantial amounts of moisture while operating at low altitudes. One important function of the ECS is to remove most of the moisture that would otherwise condense and be supplied as unwanted liquid droplets in the cool supply of conditioned air to the cabin.

Two main ECS types have been used most recently and are considered state of the art for an efficient air cycle ECS. These ECSs are referred to as the 3 wheel and 4 wheel high pressure water separation (HPWS) systems. The reference to 3 wheels relates to the fact that three rotating aerodynamic impellers (namely, one turbine, one compressor and a fan) are tied to one another by a common drive shaft. The bleed air is usually pre-cooled within a single, primary heat exchanger where the heat is rejected to ambient air, and then flowed to the single compressor. The fan moves the ambient air through the heat exchanger while the aircraft is on the ground and no air speed is available to push the air through such exchanger. Because water is removed before the air flow reaches the turbine, the flow is at a relatively high pressure created by the single compressor. Hence, the term "high pressure water separation" is used.

Typically following compression in the 3 wheel HPWS system, an ambient air secondary heat exchanger, a reheater, and a condenser are employed for air cooling and water condensation. The secondary ambient air heat exchanger cools the air back to near ambient temperature. Next, the reheater further cools the air and the condenser then completes the cooling process. In the condenser, a temperature is reached where most of the water content has to condense into a liquid form. Some prior condensation, however, takes place in the secondary heat exchanger and the reheater.

After final condensation in the condenser, the liquid water is removed by a water extractor. The resulting dehumidified air flows to the reheater where it cools the incoming moisture laden bleed air and, in turn, the dehumidified air is reheated. The reheated dehumidified air, which contains essentially no liquid moisture, is then supplied to the single turbine for expansion and cooling. A cool, expanded air from the turbine is then flowed into the condenser where the incoming moisture laden bleed air is cooled. In the condenser, the cool expanded air absorbs a heat load equal to the heat of condensation removed from the moist bleed air and the sensible cooling load corresponding to the temperature reduction imparted to the bleed air while in heat exchange in the condenser. The air from the turbine, which has now been warmed in the condenser, is then directly supplied to the cabin.

A feature of the current 3 wheel HPWS system is that the reheater is used to recover part of the cooling load necessary for water condensation. This is because the turbine can transform the extra energy represented by the combined pressure and temperature of the incoming reheated, dehumidified air into mechanical energy (i.e., shaft power), and can deliver air at lower pressure and temperature. As air at higher temperature is input to the turbine after being warmed up in the reheater, the thermodynamic laws of expansion dictate that a larger temperature drop occurs in the turbine, as well as more turbine power. This extra cooling and mechanical power represent a partial "recovery" of the heat energy added to the flow in the reheater that is not passed on to the cabin. The recovery is, in fact, only minimal in the 3 wheel HPWS because there is only a partial amount of condensation that occurs in the reheater. The majority of the energy related to the water condensation process is exchanged in the condenser and is not returned to the turbine for recovery. Instead, such non-recovered energy finds its way directly into the cabin in the form of higher supply temperature In a 4 wheel HPWS system, a second turbine (i.e., the fourth wheel) is added downstream of the condenser. With both the 3 and 4 wheel systems, the dehumidified air leaving the condenser contains extra heat exchanged in the condensing process. In the 4 wheel system, instead of adding entirely to the cabin supply temperature, that extra heat provides a higher energy level to the air entering the second turbine, and partial recovery of that energy can take place in the second turbine. At typical turbine pressure ratios and efficiencies, the 4 wheel system is generally more energy efficient than the above 3 wheel system.

Despite the general energy efficiency advantage of the prior 4 wheel HPWS design over the 3 wheel HPWS design, the former still has disadvantages. A drawback of the fan being tied to the compressor and turbines is that optimal operation of each of the 4 wheels must be balanced against each other, which usually means one or more of the 4 wheels operating at less than optimum levels. A further disadvantage is that the fan draws power from the system and thereby reduces the amount of available power for compression. With less compression, there is less of a pressure ratio drop for the turbines, which means less cooling capacity.

Additionally, in the prior 4 wheel HPWS, the temperature flow from the first turbine and into the condenser typically needs to remain above freezing. Such a temperature limitation imposes a pressure ratio expansion or temperature drop limitation across the first turbine. With a temperature drop limitation, there is an accompanying energy recovery limitation on the first turbine.

Both the 3 and 4 wheel systems usually remove water at a pressure level resulting from typical "low stage" port bleed from the engines, plus one subsequent stage of compression in the ECS itself. Higher water extraction efficiency could result from condensing at higher pressures, leading to drier air supply. Alternatively, higher condensing temperatures could be used if pressures were higher for the same water removal capability, which would reduce heat exchanger size and sensible heat energy penalties. To achieve higher condensing pressures, current systems would have to rely on higher bleed pressures, which are either unavailable from current APUs and engines or would be more costly in engine fuel usage.

Past attempts have been made in various ways to address the issue of higher pressures by calling for dual stages of compression in the ECS itself. For example, U.S. Pat. No. 3,289,436 uses both dual compressors and dual turbines with RAM heat exchangers intercooling after each stage of compression. This system, however, was designed for operation at high aircraft speeds (i.e., supersonic) with high bleed pressures and high temperatures from the engine. Because the RAM heat exchangers are in series for the RAM air, they result in large size and length. Further, the series arrangement of the turbines does not show any provision for condensing water. Indeed, the disclosed invention does not address the issue of water separation and extraction, a fundamental aspect of system efficiency.

U.S. Pat. No. 2,767,561 also shows the use of two stages of compression and expansion, but does not describe any particular heat exchanger configuration regarding the RAM air circuit. If the heat exchangers are used in parallel to the RAM flow, they will lead to large size and excessive ram flow usage. If used in series, the second intercooler will lead to elevated turbine inlet temperatures, which is unsuitable for adequate water extraction. In fact, the disclosed invention does not address water extraction. Designed for high speed and high engine bleed pressures, this system is not compatible with current needs for high efficiency, low fuel usage, and relatively low engine bleed pressures.

The prior use of two compressors but with only a single turbine is shown in U.S. Pat. No. 4,312,191. The first compressor is used to boost the pressure level of cabin air which is recirculated and later cooled by the system. However, this system describes a water separation method only at low pressure after the turbine expansion. Therefore, the system is less efficient at removing water than the current 3 and 4 wheels HPWS. Furthermore, the air cycle system is not self-powered, thus requiring complex mechanical drives.

As can been seen, there is a need for an improved ECS and improved method for higher pressure water condensation and extraction in an ECS, both of which increase efficiency. Specifically, there is a need to increase the pressure expansion ratio available to the turbines to provide greater cooling capacity. Another specific need is to lower the energy requirement for water condensation in the condenser and leave more energy for useful work. Likewise, there is a need to minimize energy losses incurred in the water condensation and removal process of an ECS. Specifically, there is a need for an ECS to reduce the amount of water condensation energy that is added in the form of heat to the supply stream to the enclosure. There is a further need for an ECS and method of condensation that provides more cooling capacity for a given sized system, or a smaller sized system for a given load. In particular, there is a need for heat exchanger configurations that not only minimize size, weight, and RAM air usage but also intercool between staged compressions.

SUMMARY OF THE INVENTION

The present invention is directed to an improved ECS with two or more stages of compression and of expansion, while allowing for separate operation of a fan to pull RAM air through heat exchangers. The system comprises a plurality of compressors capable of compressing a water vapor bearing air to produce a highly compressed air; a reheater capable of cooling the compressed air; a condenser in flow communication with the reheater, with the condenser being capable of condensing the water vapor; a water extractor in flow communication with and intermediate of the condenser and the reheater; and a plurality of turbines in flow communication with and downstream of the reheater. The invention is also directed to an improved arrangement of RAM heat exchangers that minimizes system weight and size, while maintaining maximum cycle temperatures within a range where lightweight material (such as aluminum) can be used.

The invention is also directed to an improved method of conditioning water vapor bearing air while minimizing energy losses during water removal. Such method comprises the steps of compressing the water vapor bearing air in a plurality of stages to produce a highly compressed air; cooling the compressed air in a reheater; condensing water vapor from the compressed air in a condenser such that the compressed air can become a dehumidified air; absorbing a heat of sensible cooling and a heat of condensation by the dehumidified air in the reheater; and routing the dehumidified air through at least two turbines for supply to an enclosure.

These and other features, aspects, and advantages of the present invention will become better understood with reference to the following drawings, description, and claims.

BRIEF DESCRIPTION OF THE DRAWINGS

FIG. 4 is a schematic diagram of a fourth embodiment of an environmental control system according to the present invention;

FIG. 5 is a schematic diagram of a fifth embodiment of an environmental control system according to the present invention;

DETAILED DESCRIPTION OF THE INVENTION

Figure 1:
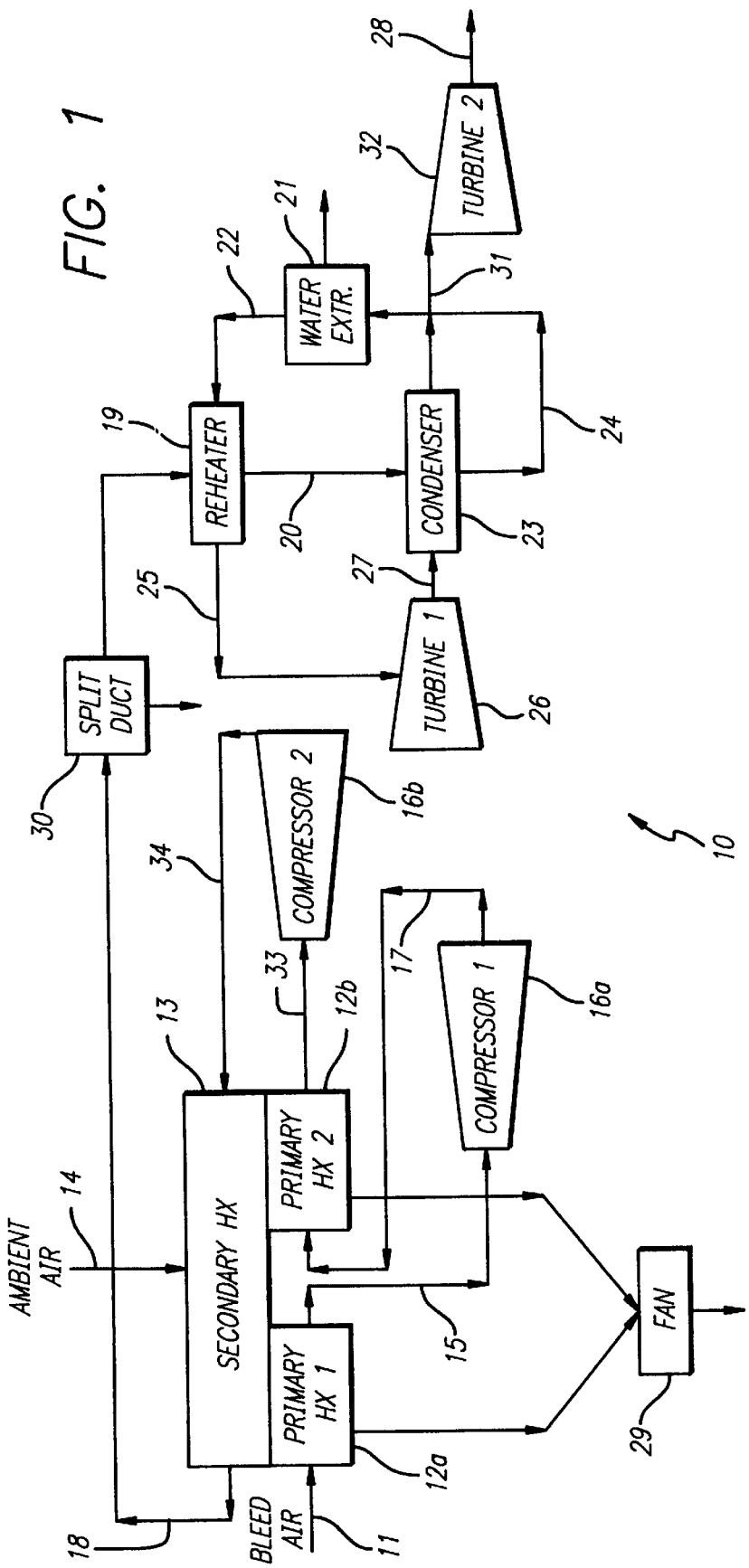
FIG. 1 is a schematic diagram of one embodiment of an environmental control system according to the present invention.

FIG. 1 schematically shows one embodiment of an air cycle, 4 wheel environmental control system 10 according to the present invention. The system 10 generally operates by receiving a bleed air stream 11 to be conditioned for eventual supply to an enclosure, such as the cabin of an aircraft. The conditioning of the bleed air 11 includes removing water vapor and lowering the temperature. The operation of the present invention, as described hereinafter, corresponds to sea level or low altitude conditions when substantial water vapor is present in the ambient air and has to be removed by the system 10.

In the context of an aircraft, the bleed air 11 comes from a turbine engine. The system 10 (FIG. 1) is designed for alternately cooling the bleed air 11 in a plurality of primary heat exchangers 12a, b which operate in series and compressing the air in a plurality of compressors 16a, b which also operate in series. Thereafter, the air flow moves into a secondary heat exchanger 13 which provides cooling and some water vapor condensation. When the flow is subsequently routed into a reheater 19 for further cooling, additional condensation can occur. Upon even further cooling of the air in a condenser 23, all of the desired water vapor condensation in the system 10 is achieved. After liquid water is extracted, the air is returned to the reheater 19 and then expanded by a first turbine 26. From the turbine 26, the air returns to the condenser 23, enters a second turbine 32 for expansion, and then exits as a supply 28 to the cabin of the aircraft. Several alternative embodiments of the invention are also contemplated, as shown in FIGS. 2–7. And even though the present invention is described in the context of an aircraft, it is contemplated that many different environments can incorporate the system 10, such as buses and other ground vehicles where a source of compressed air is available.

In more particularly describing one preferred embodiment of the present invention (FIG. 1), the bleed air 11 is pre-cooled in a pair of sequentially operating, primary heat exchangers 12a, b. As known in the art, if the bleed air 11 is from an aircraft turbine engine, the humidity and temperature of the air 11 can vary widely, and commonly encountered humidity may range from about 0 to 100% while temperatures may range from about 200 to 450 degrees F. Specifically, the first primary heat exchanger 12a receives and pre-cools the bleed air 11 by a heat exchange process with an ambient or RAM air 14 which can be drawn by a fan 29 described below. A pre-cooled air then exits the first primary heat exchanger 12a through a duct 15 and enters a first or intermediate pressure compressor 16a. The compressor 16a is capable of compressing the pre-cooled air to an intermediate or mid-pressure. While the amount of compression can vary depending upon the particular environment for the system 10, it is contemplated that the pressure range for the first compressor 16a in this embodiment of the invention is about 50 to 65 psia. Thereby, a mid or intermediate pressure air exits the compressor 16a, flows through a duct 17 and enters the second primary heat exchanger 12b.

Similar to the first primary heat exchanger 12a, the second primary heat exchanger 12b cools the mid-pressure air by removing heat added to the air from its prior compression in compressor 16a. The heat removal is accomplished by a heat exchange process between the mid-pressure air and the ambient air 14 which is being drawn by the fan 29. As can be seen in FIG. 1, the first and second primary heat exchangers 12a, b are operating in parallel to one another with respect to the RAM air 14. In other words, and as further described below, the ambient air 14 is split into parallel routes for entrance into the primary heat exchangers 12a, b on their RAM air sides.

The fan 29, in this embodiment, is operable separately from the Compressors 16a, b and the turbines 26, 32. This is unlike prior 4 wheel systems which have used a single shaft to provide common rotating engagement among the fan, the single compressor, and the two turbines. Instead, the present invention contemplates that the fan 29 is a separately powered unit which might, for example, be of an electrical or a turbofan type. Because of such separate operation, the fan 29 can be placed in a nonoperating mode, for example, when the aircraft is operating at a higher altitude and the fan 29 is not needed to draw air through the heat exchangers 12a, b. Also, the fan operating speed can be optimized without compromising the speed of turbines 26, 32 or compressors 16a, b and result in a higher power efficiency for all of such components.

From the second primary heat exchanger 12b, a re-cooled air exits through a duct 33 and into the second or high pressure compressor 16b. In the high pressure compressor 16b, the re-cooled air is compressed to a pressure higher than that achieved by the intermediate pressure compressor 16a. Although the amount of pressure can vary for the environment, this embodiment contemplates that the air is raised to about 70 to 90 psia in the high pressure compressor 16b. It can be appreciated from the foregoing that the bleed air 11 is being compressed in stages or in a stepwise fashion through the compressors 16a, b. Similarly, the bleed air is being cooled in the primary heat exchangers 12a, b in a staged or stepwise fashion. Together, the primary heat exchangers 12a, b and the compressors 16a, b are operating in series and, in so doing, creating an alternating cooling and compression of the bleed air 11. And although the embodiment shown in FIG. 1 depicts only two stages of cooling and compression, the present invention contemplates that the number of primary heat exchangers 12 and number of compressors 16 can exceed more than two, if it is desired to increase the number of stages of cooling and/or compression.

Irrespective of the number of cooling and/or compression stages, the last compression stage, which is provided in this embodiment by the compressor 16b, produces a high pressure or highly compressed air that exits through a duct 34. From the duct 34, a secondary heat exchanger 13 cools the high pressure air to a temperature level that might be sufficient to cause some condensation of the water vapor in the high pressure air. Although the amount can vary for different environments, this embodiment contemplates that about 0 to 30% of the total water vapor content in the bleed air 11 is condensed in the secondary heat exchanger 13. The secondary heat exchanger 13 cools the high pressure air and condenses the water vapor by removing heat added during the prior compression stages. The heat is removed by placing the high pressure or compressed air in heat exchange relationship with the ambient air 14.

Also, it can be seen in FIG. 1 that the secondary heat exchanger 13 routes the ambient air 14 in substantially equal parts to the primary heat exchangers 12a, b. Thus, the operation of the secondary heat exchanger 13 is in series with the primary heat exchangers 12a, b. Taking the overall combination of the secondary heat exchanger 13 and the primary heat exchangers 12a, b, the operating configuration in FIG. 1 may be described as a "series-parallel" or "split primary" configuration.

A high pressure or highly compressed, cooled air exits the secondary heat exchanger 13 and enters a duct 18. At this point, the high pressure, cooled air is still laden with the water vapor which entered the system 10. However, a limited amount (up to about 30% in this embodiment) of water vapor may have already condensed due to the temperature reduction in the secondary heat exchanger 13. A portion of that condensed water may optionally be removed by a water extractor 30 which could be of a split duct type or other configuration prior to entering the reheater 19.

The reheater 19 further cools the high pressure, cooled air. The cooling occurs through a heat exchange relationship between the high pressure, cooled air and a coolant medium which comprises a flow downstream of the condenser 23, as further described below. The heat exchange in the reheater 19 lowers the temperature of the high pressure air but not to a point where a substantial amount of water vapor condenses as a liquid. In this embodiment, for example, only about 10 to 30% of the total water vapor in the bleed air 11 is condensed in the reheater 19. Of course, the amount of condensation in the reheater 19 can vary with the particular requirements of the enclosure or environment to be supplied.

Upon the reheater 19 cooling the high pressure, cooled air, a water vapor bearing cooled air flow is created and which still contains a substantial amount of water vapor. The cooled air flow then moves through a duct 20 and into a condenser 23 to condense substantially all of the remaining water vapor. The condenser 23 also uses heat exchange for its condensation function whereby a coolant medium is a flow downstream of the first turbine 26, which is further described below. In the embodiment of FIG. 1, preferably more than about 40% of the initial water content in the bleed air 11 condenses in the condenser 23, although the amount of condensation may vary for the environment. As a result of such water vapor condensation, a condensed water/air flow is produced and which can become a dehumidified air by mechanically removing the condensed water.

The removal of the liquid water from the condensed water/air flow is achieved by a water extractor 21 which is flow connected to the condenser 23 by a duct 24. Usefully, more than about 80% of the water is removed and, more preferably, about 90 to 95% is removed. Nevertheless, the total water content of the dehumidified air can vary depending upon the sizing requirements and the environment of the system 10. The dehumidified air leaves the water extractor 21 via a duct 22.

Through the duct 22, the dehumidified air returns to the reheater 19 wherein the dehumidified air acts as a coolant medium when it is placed in heat exchange relationship with the high pressure, cooled air from the secondary heat exchanger 13. Consequently, and since a relatively small amount of condensation occurs in the reheater 19, the dehumidified air absorbs a relatively small amount of a heat of sensible cooling and a heat of condensation given off from the high pressure, cooled air bearing water vapor. Accordingly, the dehumidified air is reheated in the reheater 19. As the dehumidified air is reheated, the system 10 is designed so that essentially all water remaining in liquid form evaporates and a dry airstream can exit the reheater 19.

The reheated dehumidified air is delivered from the reheater 19 through a duct 25 and to the first turbine 26. Since the reheated dehumidified air contains absorbed sensible heat and condensation heat, the absorbed heat remains available for recovery and conversion into useful mechanical energy. In this invention, a partial recovery occurs when the reheated air is flowed into and expanded by the first turbine 26. In addition to the recovery of sensible heat and condensation energy in the form of mechanical energy to the turbine rotating assembly, the first turbine 26 cools the air when it is expanded and, thus, provides a cooler air supply 28.

The expanded air from the turbine 26 flows through a duct 27 to enter the condenser 23. In the condenser 23, the expanded air serves as a coolant medium when placed in a heat exchange relationship with the water vapor bearing cooled air from the reheater 19. From such heat exchange relationship, the expanded air is warmed by virtue of it absorbing a heat of sensible cooling and heat of condensation from the water vapor bearing cooled air. After warming, a warmed air exits the condenser 23 through a duct 31 and enters the second turbine 32 which is in rotating engagement (not shown) with the first turbine 26, as well as the compressors 16a, b.

As with the first turbine 26, the second turbine 32 recovers energy from rejected heat of condensation and heat of sensible cooling in the system 10 by expansion of the warmed air from the condenser 23. But in contrast to the first turbine 26, the amount of energy recovery in the second turbine 32 is greater in the sense that a greater amount of condensation occurs in the condenser 23 when compared to the reheater 19. Irrespective of the amount of relative recovery, the recovery by both turbines 26, 32, can be used, for example, to increase their rotating speed, boost their pressure ratio, and increase the expansion of the reheated air as a result of the common rotating engagement of the turbines 26, 32 and the compressors 16a, b. In any event, from the second turbine 32, an air exits as the supply 28.

It can be seen from FIG. 1 that the present invention includes the steps of pre-cooling the water vapor bearing bleed air 11 in a plurality of primary heat exchangers 12a, b and alternately compressing the air 11 in a plurality of stages by a plurality of compressors 16a, b. As the air is being compressed over stages, the pressure of the air is being increased in a stepwise fashion, and a high pressure or highly compressed, cooled air is produced. The next step includes re-cooling and possibly condensing some water vapor from the air flow in a secondary heat exchanger 13. A subsequent step is cooling the high pressure air in a reheater 19 where some water vapor condensation occurs. The reheater 19 thus produces a water vapor bearing cooled air flow containing a relatively small amount of condensed water. The condenser 23 is then used to accomplish most of the water vapor condensation in the system 10. A step of extracting condensed water next occurs when the condensed water/air flow moves from the condenser 23 and through the water extractor 21. Upon extraction of the condensed water, the dehumidified air is produced.

A following step includes the dehumidified air being routed back through the reheater 19 such that the dehumidified air is in heat exchange relationship with the high pressure, cooled air. Thereby, the system 10 includes a step of absorbing an energy of sensible cooling and of condensation removed from the water in the reheater 19. The reheated air from the reheater 19, which carries the absorbed heat, is then expanded in the first turbine 26. In so doing, the absorbed heat is partially recovered by the turbine 26 and transformed into useful mechanical energy, rather than allowing such absorbed heat to be simply added to the supply 28. The expanded air from the first turbine 26 is then placed in heat exchange relationship with the water vapor bearing cooled air in the condenser 23 such that a step of again absorbing an energy of sensible cooling and of condensation occurs. Thereafter, the expanded air exits the condenser 23 and flows to the second turbine 32 for additional cooling and further recovery of the absorbed heat of condensation and sensible cooling. Finally, the cooled air is supplied to the enclosure or cabin.

Figure 2:
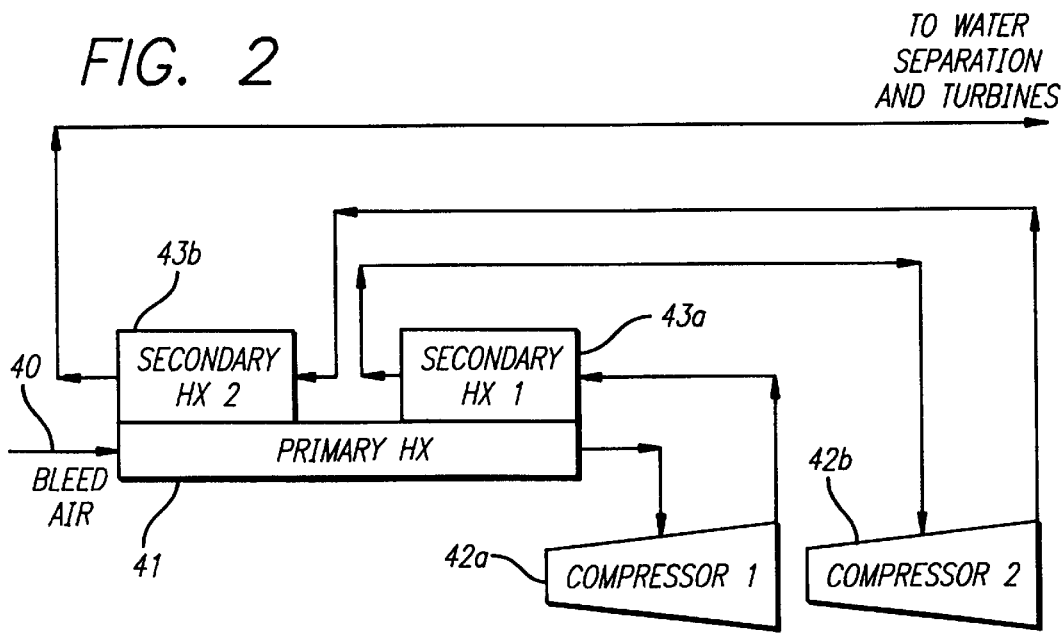
FIG. 2 is a schematic diagram of a second embodiment of an environmental control system according to the present invention.

In referring to alternative embodiments of the present invention, FIG. 2 depicts a second embodiment which can be described as a "split secondary heat exchanger" configuration. In the second embodiment, a bleed air 40 enters a single primary heat exchanger 41 such that the air 40 is pre-cooled by heat exchange with an ambient air (not shown). A pre-cooled air from the primary heat exchanger 41 is then compressed in a first or intermediate compressor 42a such that the air is pressurized to an intermediate pressure. From the first compressor 42a, the air is again cooled in a first secondary heat exchanger 43a by heat exchange with the ambient air. A re-cooled air exits the heat exchanger 43a for compression to a high pressure in a second or high pressure compressor 42b. The flow from the compressor 42b is directed into a second secondary heat exchanger 43b for cooling by heat exchange with the ambient air. Thereafter, the air flow can be subjected to water separation and turbine expansion by, for example, the arrangement of the reheater 19, condenser 23, water extractor 21, and turbines 26, 28, as shown in FIG. 1. Some of the advantages presented by the second embodiment are that the first secondary heat exchanger 43a can provide cooling of the first compressor 42a air with higher effectiveness, as its coolant medium (the RAM air) is at its coldest available temperature. Thus, the secondary heat exchanger 43a may be smaller in this embodiment when compared to the first embodiment.

Figure 3:
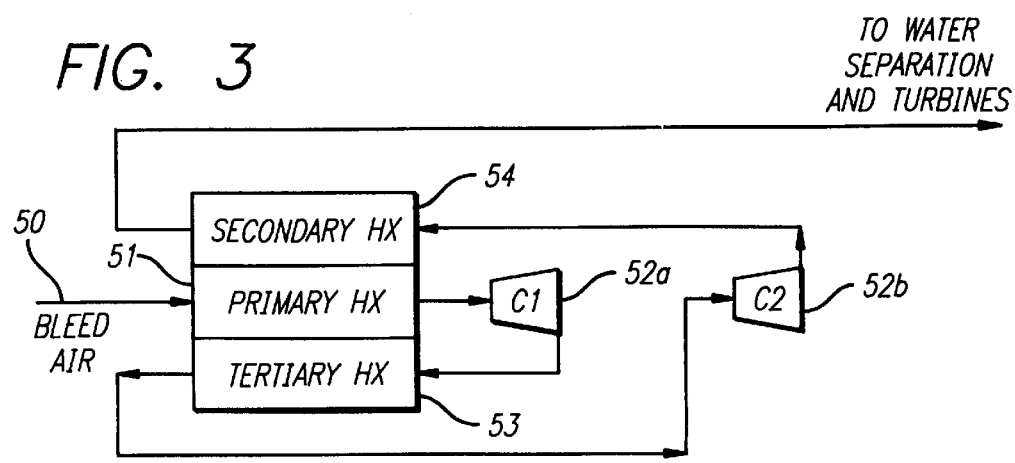
FIG. 3 is a schematic diagram of a third embodiment of an environmental control system according to the present invention.
Figure 6:
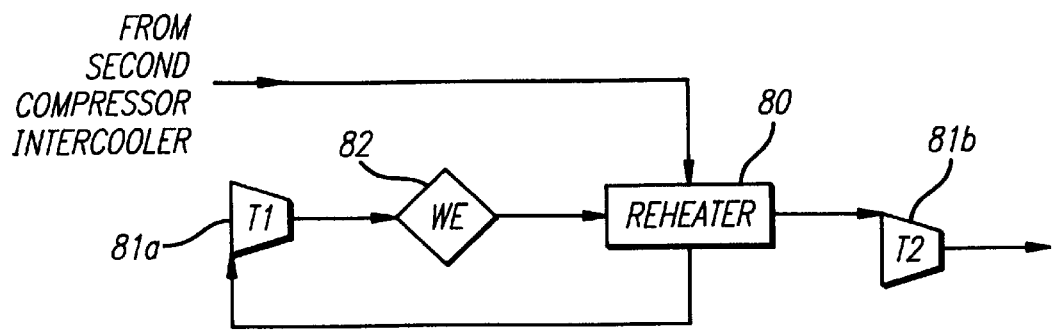
FIG. 6 is a schematic diagram of a sixth embodiment of an environmental control system according to the present invention.

FIG. 3 shows a third embodiment of the present invention which can be termed a "tertiary heat exchanger" configuration. Therein, a bleed air 50 is pre-cooled in a primary heat exchanger 51 due to heat exchange with an ambient air (not shown). The air is then compressed to an intermediate pressure by a first or intermediate pressure compressor 52a. The flow is re-cooled in a tertiary heat exchanger by heat exchange with the ambient air. The air is again compressed, but now to a high pressure by a second or high pressure compressor 52b. Next, the high pressure air from the compressor 52b passes through a secondary heat exchanger 54 for additional cooling by heat exchange with the ambient air. The flow can then be subjected to water extraction and turbine expansion, as in the second embodiment for example. Some of the advantages of the third embodiment are that it avoids splitting the RAM air flow in parallel streams, as in FIGS. 1 and 2, resulting in less pressure drop overall and a reduced use of RAM air associated with lower fan power.

A fourth embodiment of the present invention is shown in FIG. 4 and described as a "second stage, non-intercooled" configuration. Therein, the ECS comprises a first subsystem for cooling and compressing a bleed air 60 and a second subsystem for water vapor condensation, water vapor extraction, and cooling. In the first subsystem, the bleed air 60 is pre-cooled by a primary heat exchanger 61 from heat exchange with an ambient air (not shown) and then compressed to an intermediate pressure by a first or intermediate pressure compressor 62a. An intermediate pressure air from the compressor 62a is then re-cooled in a secondary heat exchanger 63 by heat exchange with the ambient air. A re-cooled air from the secondary heat exchanger 63 represents a last cooling step before the air is next compressed to a high pressure by a second or high pressure compressor 62b which represents a last compression step. However, unlike the above embodiments of the present invention, the fourth embodiment does not utilize another heat exchanger to re-cool the high pressure air from the compressor 62b. Instead, the high pressure air is flowed directly into the second subsystem for water separation and turbine expansion, as with the above embodiments. Some of the advantages of the fourth embodiment are that a smaller system package can be achieved with less heat transfer components.

While the fourth embodiment may be described as a high pressure, nonintercooled, water separation system, the fifth embodiment of the present invention may be termed a "second stage, non-intercooled, mid-pressure water separation" configuration (FIG. 5). In the fifth embodiment, a first subsystem is provided for cooling and compression while a second subsystem provides water vapor condensation, water vapor extraction and cooling. Initially, a bleed air 70 enters a primary heat exchanger 71 of the first subsystem for pre-cooling. Next, the flow is compressed in a first or intermediate pressure compressor 72a. An intermediate pressure air from the compressor 72a is re-cooled in a secondary heat exchanger 73. From the exchanger 73, a re-cooled air is compressed to a high pressure by a second or high pressure compressor 72b. In contrast to the first through fourth embodiments, the fifth embodiment directs the high pressure air directly into a first turbine 73a of the second subsystem for expansion rather than to the reheater 19, condenser 23 and water extractor 21. Thus, in the fifth embodiment, the air is first expanded by the first turbine 73a, and thereby causes a pressure drop and condensation of water vapor. Because the pressure is dropped before condensed water vapor is extracted by a water extractor 74, the water separation is considered to be at a midpressure, not a high pressure. After water extraction, the flow is again expanded by a second turbine 73b. Some of the advantages of the fifth embodiment are that it includes less components and is therefore potentially lighter and less costly to manufacture when compared to the above embodiments. In the absence of re-cooling of the second compressor 72b flow, the conditions at the turbine 73a inlet are always dry, preventing detrimental icing within the turbine 73a. Because two stages of compression are used, the first turbine 73a expansion and subsequent water condensation, although at mid-pressure, are nevertheless at a sufficient pressure level for efficient water extraction.

A sixth embodiment of the present invention (FIG. 6) is referred to as a "mid-pressure water separation" configuration which may, for example, be used in connection with the first, second, third or fourth embodiments above. Therefore, with the first embodiment as an example, the primary heat exchangers 12a, b, the secondary heat exchanger 13, and the compressors 16a, b can comprise a first subsystem and be used upstream of the configuration shown in FIG. 6. In so doing, the high pressure air flow from the second or high pressure compressor 16b would pass into a second subsystem which includes a reheater 80. In the reheater 80, the flow is in heat exchange relationship with a dehumidified air coming from a water extractor 82. From the reheater 80, a water vapor bearing cooled air flows directly into a first turbine 81a for expansion and a consequent pressure drop to a mid-pressure. The expansion also cools the air and causes water vapor condensation. An expanded air from the first turbine 81a passes into a water extractor 82 such that condensed water vapor can be extracted. The dehumidified air from the extractor 82 flows into the reheater 80 where the dehumidified air acts a coolant medium when placed in heat exchange with the high pressure air from the compressor 16b. Upon the dehumidified air absorbing heat in the reheater 80, it is directed into a second turbine 81b for further expansion and recovery of the previously absorbed heat. Some of the advantages of the sixth embodiment are that, due to the presence of the reheater 80, the conditions at the inlet of the second turbine 81b are dry, thus avoiding icing problems within that unit. Also, when compared to the first embodiment, the condenser 23 has been eliminated, leading to a lighter and less expensive system.

Figure 7:
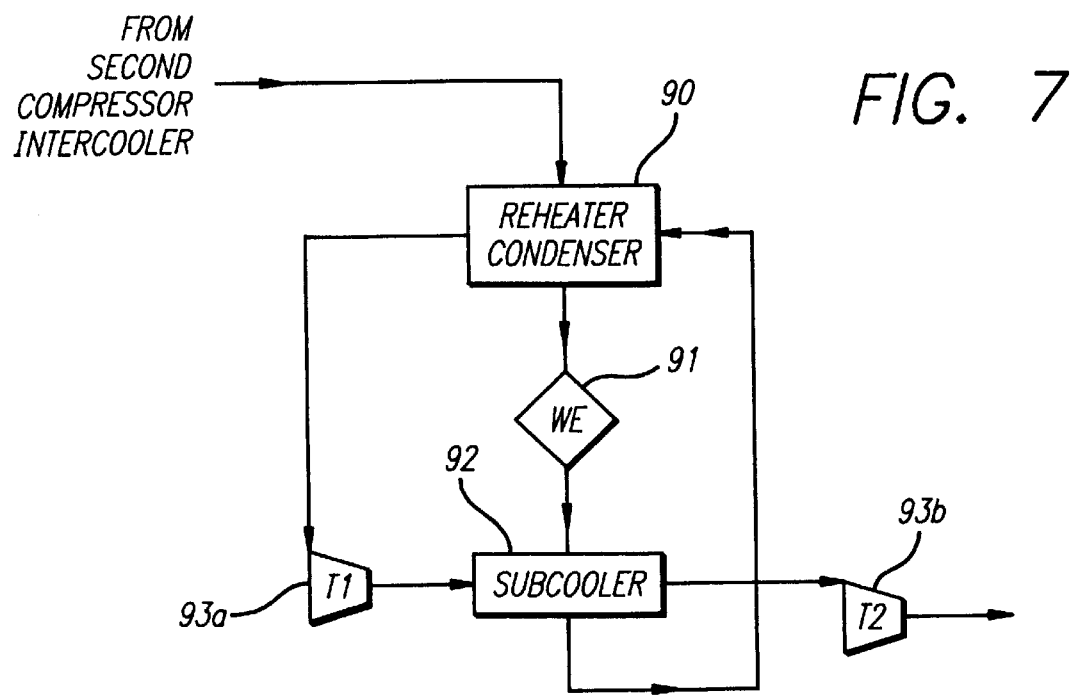
FIG. 7 is a schematic diagram of a seventh embodiment of an environmental control system according to the present invention.

A seventh embodiment of the invention, as depicted in FIG. 7, is referred to as a "reheater condenser water separation" configuration. Like in the sixth embodiment, the seventh embodiment can utilize a first subsystem comprising cooling and compression components shown in FIGS. 1–4. In utilizing the first embodiment shown in FIG. 1, a high pressure flow from the second compressor 16b can enter a second subsystem comprising a reheater condenser 90. Therein, the high pressure air is placed in heat exchange with a dehumidified, cooled air from a subcooler 92. The high pressure air is thus cooled in the reheater condenser 90 to cause condensation of water vapor in the air. The condensed water vapor can then be extracted by a water extractor 91. A dehumidified air from the extractor 91 flows into a subcooler 92 whereby the air is further cooled but without significant water vapor condensation. The cooled, dehumidified air from the subcooler 92 moves into the reheater condenser 90 where it can absorb heat from the high pressure air. A reheated dehumidified air from the reheater condenser 90 then flows into a first turbine 93a. The air is then expanded in the first turbine 93a to produce an expanded air and allow a recovery of some of the previously absorbed heat. The expanded air can then act as a coolant medium when placed in heat exchange with the dehumidified air in the subcooler 92. Upon the expanded air being warmed in the subcooler 92, the air is then expanded in a second turbine 93b and additional heat recovery can occur. Advantages of the seventh embodiment include high energy recovery in the first and second turbines 93a, b, and the possibility to operate both turbines 93a, b at a subfreezing supply temperature for high performance.

It should be understood that the above embodiments represent only some of the embodiments considered to be within the scope of the present invention. Thus, any one of the turbine/water condensation embodiments shown in FIGS. 5–7 can be combined with any one of the RAM heat exchanger/compressor cooling embodiments shown in FIGS. 1–4, all of which can be subject to further variants within the scope of the present invention.

As can be appreciated by those skilled in the art, the present invention increases operating efficiency of an air cycle ECS by increasing the operating pressure of the system 10 when compared to the conventional 3 and 4 wheel HPWS. This increase in pressure is realized by passing the bleed air 11 through a plurality of staged compressors 16a, b. At the same time, the plurality of primary heat exchangers 12a, b, which are operating in parallel to one another, cools the air flow which is increasing in temperature due to the increasing compression. With a higher operating pressure in the system 10, a greater pressure expansion ratio can be achieved in the system 10. And with a greater pressure expansion ratio, greater cooling capacity can be achieved when compared to conventional systems.

Furthermore, with a higher operating temperature due to the higher operating pressure, heat transfer is favored in the primary heat exchangers 12a, b. Therefore, the primary heat exchangers 12a, b can be of a size smaller than the single heat exchanger found in the conventional 3 and 4 wheel HPWS. Also, since the system 10 operates at a higher pressure than the conventional 3 and 4 wheel HPWS, the temperature at which condensation occurs can be at a higher temperature while achieving the same amount of water condensation as in the conventional systems. With a higher temperature for condensation in the condenser 23, less cooling energy has to be drawn from the exit air of the first turbine 26. Instead, the system 10 can rely on the ram air 14 moving through the primary heat exchangers 12a, b and secondary heat exchanger 13 to sufficiently cool the air for condensation. With greater reliance on the ram air 14 for condensation, the exit air from the first turbine 26 can be used to a greater extent for cooling the supply 28.

Additional advantages of the present invention include a fuel consumption savings. Because of the plurality of compressors 16a, b, the bleed air 11 could be taken from a lower pressure bleed stage of the aircraft engine. At such a lower bleed stage, less fuel is consumed and, thus, the fuel savings. Further efficiency of the system 10 is achieved by the separately operable fan 29. With a conventional fan tied to the single compressor and the single/double turbine(s), the overall pressure ratio in the system is reduced by the fan load. With the fan 29 not being engaged to the compressors 16a, b or the turbines 26, 32 in the present invention, the overall pressure ratio is not diminished by the fan 29.

In comparison to the conventional 3 wheel HPWS, greater efficiency is also achieved in the present invention by having two turbines 26, 32 rather than one. Thus, instead of providing only a single opportunity for energy recovery two opportunities are provided, allowing a larger potential recovery. The present invention transforms the absorbed heat into energy that can increase the speed of the turbines 26, 32 which results in greater air expansion and cooling. At the same time, the compressors 16a, b, which are mechanically tied to the turbines 26, 32 by a common shaft (not shown), receive more energy for compression. The result is that the supply 28 can be cooler and have a greater cooling capacity. Alternatively, the needed amount of ambient air 14 could be reduced, as well as the size of the primary heat exchangers 12a, b and secondary heat exchanger 13, while delivering a given cooling capacity.

As indicated above, the conventional 4 wheel HPWS has a disadvantage of a restricted pressure expansion ratio or temperature drop across the first turbine. In the present invention, such restriction is minimized or eliminated by the increased operating pressure and operating temperature which effectively increases the pressure expansion ratio over the first turbine 26 while still keeping its outlet flow above freezing. Without such restriction, the amount of energy recovery in the first turbine 26 is not accordingly restricted by a concern over freezing.

It should be understood, of course, that the foregoing relates to preferred embodiments of the invention and that modifications may be made without departing from the spirit and scope of the invention as set forth in the following claims.

What is claimed is:

1. A method for conditioning water vapor bearing air for supply as conditioned air to an enclosure, comprising the steps of:

compressing said water vapor bearing air in a plurality of stages to produce a compressed air;

cooling said compressed air in a reheater;

condensing water vapor from said compressed air in a condenser such that said compressed air can become a dehumidified air;

absorbing a heat of sensible cooling and a heat of condensation by said dehumidified air in said reheater; and routing said dehumidified air through at least two turbines for supply to said enclosure.

2. The method of claim 1, wherein the step of compressing said water vapor bearing air comprises the step of increasing a pressure of said water vapor bearing air in an increasing stepped fashion.

3. The method of claim 1, wherein the step of compressing said water vapor bearing air comprises the step of passing said water vapor bearing air through at least two compressors.

4. The method of claim 1, further comprising the step of placing in heat exchange relationship said compressed air and said dehumidified air, the step of placing in heat exchange relationship occurring in said reheater.

5. The method of claim 1, further comprising the step of placing in heat exchange relationship said compressed air and an expanded air from one of said turbines, the step of placing in heat exchange relationship occurring in said condenser.

6. The method of claim 1, further comprising the step of extracting condensed water vapor from said compressed air.

7. A method for conditioning water vapor bearing air for supply as conditioned air to an enclosure, comprising the steps of:
cooling said water vapor bearing air sequentially in a plurality of primary heat exchangers;
cooling said water vapor bearing air in a reheater;
condensing water vapor from said water vapor bearing air in a condenser such that said compressed air can become a dehumidified air;
absorbing a heat of sensible cooling and a heat of condensation by said dehumidified air in said reheater; and
routing said dehumidified air through at least two turbines for supply to said enclosure.

8. The method of claim 7, further comprising the step of compressing said water vapor bearing air, the step of compressing said water vapor bearing air occurring prior to the step of cooling said water vapor bearing air in said reheater.

9. The method of claim 7, further comprising the step of compressing said water vapor bearing air, the step of compressing occurring in a plurality of compressors.

10. The method of claim 9, wherein the step of compressing comprises the step of increasing a pressure of said water vapor bearing air in an increasing staged fashion.

11. The method of claim 7, further comprising the step of alternately cooling and compressing said water vapor bearing air in said primary heat exchangers and a plurality of compressors.

12. The method of claim 11, wherein said compressors are operable in series with one another.

13. The method of claim 7, wherein said primary heat exchangers are operable in parallel to one another on a RAM air side.

14. The method of claim 7, further comprising the step of reducing an addition of heat to said supply by routing said dehumidified air through said turbines.

15. The method of claim 13, wherein at least one of said turbines is upstream of said condenser and at least another of said turbines is downstream of said condenser.

16. An improved method for conditioning water vapor bearing air by pre-cooling said air in a primary heat exchanger for eventual water vapor condensation, water vapor extraction, and further cooling, wherein the improvement comprises the steps of:
cooling said water vapor bearing air sequentially in a plurality of secondary heat exchangers which operate in parallel on a RAM air side, the step of cooling occurring after the step of pre-cooling; and
compressing said water vapor bearing air sequentially in a plurality of compressors, the step of compressing alternating with the step of cooling, and the step of compressing comprising the step of increasing a pressure of said water vapor bearing air in an increasing stepped fashion.

17. An improved method for conditioning water vapor bearing air by pre-cooling said air in a primary heat exchanger for eventual water vapor condensation, water vapor extraction, and further cooling, wherein the improvement comprises the steps of:
cooling said water vapor bearing air sequentially in a secondary heat exchanger and a tertiary heat exchanger, the step of cooling occurring after the step of pre-cooling; and
compressing said water vapor bearing air sequentially in a plurality of compressors, the step of compressing alternating with the step of cooling, and the step of compressing comprising the step of increasing a pressure of said water vapor bearing air in an increasing stepped fashion.

18. An improved method for conditioning water vapor bearing air by pre-cooling said air in a primary heat exchanger for eventual water vapor condensation, water vapor extraction, and further cooling, wherein the improvement comprises the steps of:
cooling said water vapor bearing air in a secondary heat exchanger after the step of pre-cooling, the step of cooling comprising a last cooling step; and
compressing said water vapor bearing air sequentially in a plurality of compressors, the step of compressing alternating with the step of cooling and comprising the step of increasing a pressure of said water vapor bearing air in an increasing stepped fashion, the step of increasing said pressure comprising a last compression step which follows said last cooling step.

19. The improvement of claim 18, wherein said water vapor condensation, water vapor extraction and further cooling occur in a reheater downstream of said compressors, a condenser downstream of said reheater, and a plurality of turbines downstream of said condenser and reheater.

20. The improvement of claim 18, wherein said water vapor condensation, water vapor extraction and further cooling occur in a water extractor and a plurality of turbines downstream of said compressors while in the absence of a reheater downstream of said compressors.

21. In an improved method of water vapor condensation, water vapor extraction, and further cooling of a high pressure air which is produced upon a water vapor bearing air being alternately pre-cooled and compressed in a plurality of heat exchangers and compressors, wherein the improvement comprises the steps of:
cooling said high pressure air in a reheater;
condensing water vapor from said high pressure air in a first turbine such that said high pressure air can become a dehumidified air;
absorbing a heat of sensible cooling and a heat of condensation by said dehumidified air in said reheater; and
routing said dehumidified air through a second turbine.

22. In an improved method of water vapor condensation, water vapor extraction, and further cooling of a high pressure air which is produced upon a water vapor bearing air being alternately pre-cooled and compressed in a plurality of heat exchangers and compressors, wherein the improvement comprises the steps of:
cooling and condensing water vapor from said high pressure air in a reheater condenser such that said high pressure air can become a dehumidified air;
cooling said dehumidified air in a subcooler; and
absorbing a heat of sensible cooling and a heat of condensation by said dehumidified air in said reheater condenser.

23. An air cycle environmental control system for conditioning water vapor bearing air for supply to an enclosure as conditioned air, comprising:
a plurality of compressors capable of compressing said water vapor bearing air to produce a compressed air;
a reheater capable of cooling said compressed air;
a condenser in flow communication with said reheater, said condenser being capable of condensing said water vapor;

a water extractor in flow communication with and intermediate of said condenser and said reheater; and a plurality of turbines in flow communication with and downstream of said reheater.

24. The system of claim 23, wherein said compressors are operable serially with one another.

25. The system of claim 23, wherein said compressors are capable of increasing a pressure of said water vapor bearing air over a plurality of stages.

26. The system of claim 23, further comprising a plurality of primary heat exchangers operable in parallel to one another.

27. The system of claim 23, wherein at least one of said turbines is disposed upstream of said condenser and at least another of said turbines is disposed downstream of said condenser.

28. The system of claim 23, wherein at least one of said turbines is capable of recovering a heat of condensation and heat of sensible cooling from said condenser.

29. An air cycle environmental control system for conditioning water vapor bearing air for supply to an enclosure as conditioned air, comprising:

a plurality of primary heat exchangers which are operable in parallel to one another, said primary heat exchangers being capable of cooling said water vapor bearing air;

a reheater downstream of said primary heat exchangers, said reheater being capable of cooling said water vapor bearing air;

a condenser downstream of said reheater, said condenser being capable of condensing said water vapor;

a water extractor downstream of said condenser, said water extractor capable of extracting said condensed water vapor;

a first turbine downstream of said reheater; and a second turbine downstream of said condenser.

30. The system of claim 29, further comprising a plurality of compressors in flow communication with said primary heat exchangers.

31. The system of claim 30, wherein said compressors are upstream of said reheater.

32. The system of claim 30, wherein at least one of said compressors is intermediate of at least two of said primary heat exchangers.

33. The system of claim 30, wherein said compressors are operable in series with one another.

34. The system of claim 30, wherein said reheater is capable of placing in heat exchange relationship a compressed air from at least one of said compressors and a dehumidified air from said water extractor.

35. The system of claim 29, further comprising a fan which is operable separately from said turbines.

36. The system of claim 29, wherein said condenser is capable of placing in heat exchange relationship an expanded air from at least one of said turbines and a cooled air from said reheater.

37. In an improved subsystem for conditioning water vapor bearing air and having a primary heat exchanger, said water vapor bearing air being conditioned for eventual water vapor condensation, water vapor extraction, and cooling, wherein the improvement comprises:

a plurality of secondary heat exchangers which operate in parallel on a RAM air side, said secondary heat exchangers capable of cooling said water vapor bearing air after said air has passed through said primary heat exchanger; and a plurality of sequentially operating compressors disposed in an alternating relationship with said secondary heat exchangers such that said water vapor bearing air can be pressurized in an increasing stepped fashion.

38. In an improved subsystem for conditioning water vapor bearing air and having a primary heat exchanger, said water vapor bearing air being conditioned for eventual water vapor condensation, water vapor extraction, and cooling, wherein the improvement comprises:

a plurality of secondary and tertiary heat exchangers capable of sequentially cooling said water vapor bearing air after said air has passed through said primary heat exchanger; and a plurality of sequentially operating compressors disposed in an alternating relationship with said secondary and tertiary heat exchangers such that said water vapor bearing air can be pressurized in an increasing stepped fashion.

39. In an improved first subsystem for conditioning water vapor bearing air and having a primary heat exchanger, said water vapor bearing air being conditioned for eventual water vapor condensation, water vapor extraction, and cooling in a second subsystem, wherein the improvement in said first subsystem comprises:

a secondary heat exchanger downstream of said primary heat exchanger, said secondary heat exchanger capable of providing a last cooling of said air in said system;

a first compressor intermediate said primary and secondary heat exchangers; and a second compressor downstream of said secondary heat exchanger, said second compressor capable of providing a last compression of said air in said system.

40. The improvement of claim 39, wherein said second subsystem comprises a reheater downstream of said second compressor, a condenser downstream of said reheater, and a plurality of turbines downstream of said condenser and reheater.

41. The improvement of claim 39, wherein said second subsystem comprises a first turbine directly downstream of said second compressor, a water extractor downstream of said first turbine and a second turbine downstream of said water extractor.

42. In an improved system for conditioning water vapor bearing air, aid system comprising a first subsystem for pressurizing said air and a second subsystem for extracting said water vapor and cooling said air, said first subsystem comprising a plurality of heat exchangers and a first and a second compressor, said second subsystem comprising a first and a second turbine, wherein the improvement in said second subsystem comprises:

a reheater directly downstream of said second compressor; and said first and second turbines being downstream of said reheater.

43. In an improved system for conditioning water vapor bearing air, said system comprising a first subsystem for pressurizing said air and a second subsystem for extracting said water vapor and cooling said air, said first subsystem comprising a plurality of heat exchangers and a first and a second compressor, said second subsystem comprising a first and a second turbine, wherein the improvement in said second subsystem comprises:

a reheater condenser directly downstream of said second compressor;

a subcooler downstream of said reheater; and said first and second turbines being downstream of said subcooler.

44. In an improved 4 wheel air cycle environmental control system having two turbines which are rotatably engaged to at least one compressor, a fan, a reheater, and a condenser, wherein the improvement comprises:

a plurality of primary heat exchangers for receiving a bleed air to be conditioned, said primary heat exchangers being operable in parallel to one another;

a plurality of compressors in flow communication with said primary heat exchangers, said compressors being operable in series with one another and capable of compressing said bleed air in stages; and said fan being operable separately from said turbines and said compressors.

45. The improvement of claim 44, wherein said compressors are upstream of said reheater.

46. The improvement of claim 45, wherein at least one of said compressors is intermediate at least two of said primary heat exchangers.

47. The improvement of claim 46, wherein said primary heat exchangers are operable in series with said compressors.

* * * * *